(12) United States Patent
Cheng

(10) Patent No.: US 7,915,836 B2
(45) Date of Patent: Mar. 29, 2011

(54) LIGHT-EMITTING DIODE DRIVING CIRCUIT

(75) Inventor: Chin-Chung Cheng, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 348 days.

(21) Appl. No.: 12/333,598

(22) Filed: Dec. 12, 2008

(65) Prior Publication Data

US 2010/0060190 A1 Mar. 11, 2010

(30) Foreign Application Priority Data

Sep. 5, 2008 (TW) .............................. 97134273 A
Sep. 24, 2008 (TW) .............................. 97136761 A

(51) Int. Cl.
*H05B 37/02* (2006.01)

(52) U.S. Cl. ................... 315/291; 315/209 R

(58) Field of Classification Search .............. 315/200 R, 315/209 R, 291, 307; 363/56.01, 131, 132, 363/140

See application file for complete search history.

(56) References Cited

U.S. PATENT DOCUMENTS

| | | | | |
|---|---|---|---|---|
| 6,320,330 | B1 * | 11/2001 | Haavisto et al. | 315/291 |
| 7,015,654 | B1 * | 3/2006 | Kuhlmann et al. | 315/291 |
| 7,323,828 | B2 * | 1/2008 | Russell et al. | 315/291 |
| 7,439,945 | B1 * | 10/2008 | Awalt et al. | 345/83 |

FOREIGN PATENT DOCUMENTS

TW 553672 5/2003

* cited by examiner

*Primary Examiner* — Jacob Y Choi
*Assistant Examiner* — Jimmy T Vu
(74) *Attorney, Agent, or Firm* — Apex Juris, pllc; Tracy M Heims

(57) ABSTRACT

A light-emitting diode driving circuit includes an AC/DC converting circuit for converting an AC power source into a DC power source; a switching element having an input contact connected to the AC/DC converting circuit; a control unit for outputting a control signal to the switching element at a set frequency to turn on or turn off the switching element, wherein a first resistor is disposed between a power contact thereof and the input contact of the switching element; a second resistor for enabling the control unit to detect a half-cycle voltage of the DC power source; a capacitor having a first end connected to the power contact, and a second end connected to a ground contact of the control unit; and an inductor having a first end connected to the ground contact and the second end of the capacitor, and a second end connected to a light-emitting diode.

20 Claims, 14 Drawing Sheets

LIGHT-EMITTING DIODE DRIVING CIRCUIT

CROSS-REFERENCE TO RELATED APPLICATIONS

This non-provisional application claims priority under 35 U.S.C. §119(a) on Patent Application No(s). 097134273 and 097136761 filed in Taiwan, R.O.C. on Sep. 5, 2008 and Sep. 24, 2008 the entire contents of which are hereby incorporated by reference.

BACKGROUND OF THE INVENTION

1. Field of Invention

The present invention relates to a driving circuit, and more particularly to a light-emitting diode (LED) driving circuit capable of performing half-cycle or full-cycle detection.

2. Related Art

Light-emitting diodes (LEDs) are small, light, and shock-resistant, and have fine power efficacy, long life, and low cost. Therefore, the LEDs are one of the important elements for backlight sources of liquid crystal displays.

In terms of the operation features, the luminance of an LED varies with the current, so technically, the LED is often driven in the mode that the current remains constant. As the luminance and color of each LED is directly associated with the current flowing through the LED, to realize the best performance of the LEDs, the current must be controlled precisely. Thus, when designing an application device, product developers must consider how to control the current of the LED through a driving circuit and integrated circuits (ICs), so as to control the backlight of the screen.

The patent applicant of the present invention provides an AC/DC converting circuit without a transformer in ROC Patent Publication No. 00533672. The AC/DC converting circuit without a transformer can output a stable constant current, and is applicable to load devices requiring a stable supply current, such as light-emitting elements (for example, LEDs). The technical means of the AC/DC converting circuit without a transformer is using a current switching circuit to limit a load current within a stable scope, in which a control circuit determines an ON/OFF operation of the current switching circuit according to a potential difference between an output and an input of the control circuit. When the potential difference is lower than a predetermined value, the load current is turned on, and when the potential difference is higher than a predetermined value, the load current is turned off. Thus, the load current is effectively limited.

Though the patent described above limits the load current within a stable scope by using a current switching circuit, the backlight performance of a screen may be better if the driving current of the LEDs is more effectively controlled. Therefore, it is a task for researchers to provide a driving circuit capable of precisely controlling the driving current of the LEDs.

SUMMARY OF THE INVENTION

Accordingly, the present invention is directed to a light-emitting diode (LED) driving circuit, which uses a control unit to detect a current driving current of a current LED, and controls a corresponding switching circuit of the current driving current of the LED, so as to precisely control the driving current of the LED.

The present invention provides an LED driving circuit, which includes an AC/DC converting circuit, a switching element, a control unit, a second resistor, a first capacitor, and a first inductor. The AC/DC converting circuit converts an AC power source into a DC power source. The switching element includes an input contact, an output contact, and a control contact, in which the input contact of the switching element is connected to the AC/DC converting circuit. The control unit includes a power contact, a control contact, a detecting contact, and a ground contact, in which a first resistor is disposed between the power contact of the control unit and the input contact of the switching element, and the control unit outputs a control signal to the control contact of the switching element from the control contact at a set frequency to turn on or turn off the switching element. The second resistor is disposed between the detecting contact and the ground contact of the control unit, for enabling the control unit to detect a half-cycle voltage of the DC power source. The first capacitor includes a first end and a second end, in which the first end of the first capacitor is connected to the power contact, and the second end of the first capacitor is connected to the ground contact. The first inductor includes a first end and a second end, in which the first end of the first inductor is connected to the ground contact and the second end of the first capacitor, and the second end of the first inductor is connected to a load.

Moreover, the present invention provides an LED driving circuit, which includes an AC/DC converting circuit, a switching element, a control unit, a second resistor, a first capacitor, and a first inductor. The AC/DC converting circuit converts an AC power source into a DC power source. The switching element includes an input contact, an output contact, and a control contact, in which the input contact is connected to the AC/DC converting circuit. The control unit includes a power contact, a control contact, a detecting contact, and a ground contact, in which a first resistor is disposed between the power contact of the control unit and the input contact of the switching element, and the control unit outputs a control signal to the control contact of the switching element from the control contact to turn on or turn off the switching element. The second resistor includes a first end and a second end, and is disposed between the detecting contact and the ground contact of the control unit, for enabling the control unit to detect a half-cycle voltage of the DC power source and determine whether to output the control signal. The first capacitor includes a first end and a second end, in which the first end of the first capacitor is connected to the power contact, and the second end of the first capacitor is connected to the ground contact and the first end of the second resistor. The first inductor includes a first end and a second end, in which the first end of the first inductor is connected to the second end of the second resistor, and the second end of the first inductor is connected to a load.

The LED driving circuit uses a detecting loop composed by the second resistor and the control unit to obtain the half-cycle or full-cycle driving voltage of the DC power source, and compares the obtained driving voltage and a set target voltage. According to a comparison result, the control unit turns on or turns off a current switching circuit inputting a driving current to the LED, so as to precisely control the driving current of the LED As for features and examples of the present invention, a preferred embodiment will be illustrated in detail with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
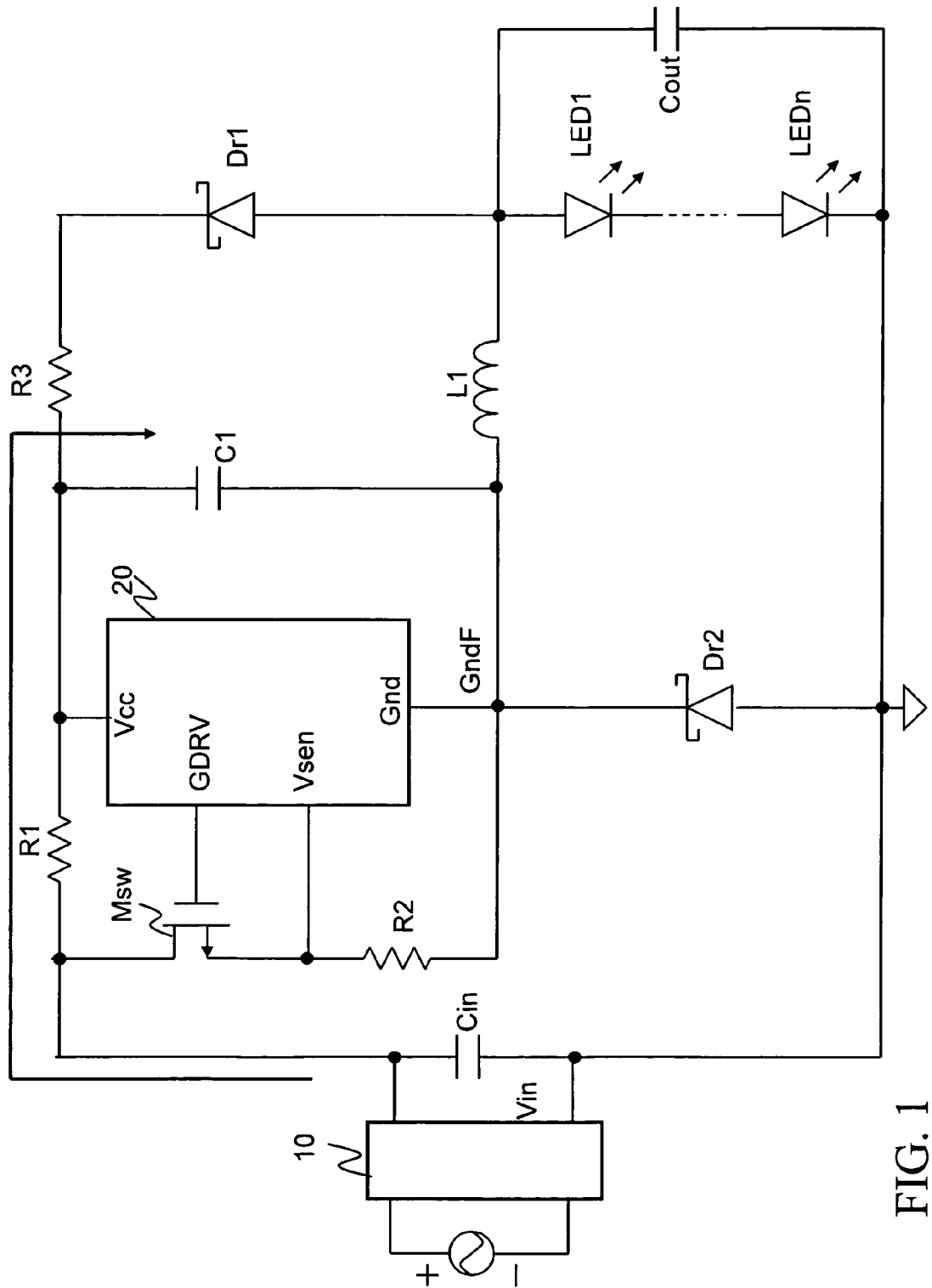
FIG. 1 is a schematic circuit diagram of a first embodiment of the present invention in a starting period.

FIG. 1 is a schematic circuit diagram of a first embodiment of the present invention in a starting period. Referring to FIG. 1, the light-emitting diode (LED) driving circuit capable of performing half-cycle detection of the present invention includes an AC/DC converting circuit 10, a first resistor R1, a switching element Msw, a control unit 20, a second resistor R2, a first capacitor C1, a first inductor L1, a third resistor R3, a first Schottky diode Dr1, and a second Schottky diode Dr2. The "connection" mentioned below refers to electrical connection The AC/DC converting circuit 10 receives an AC power source, and converts the AC power source into a DC power source Vin. An output end of the AC/DC converting circuit 10 is connected to an input capacitor Cin. The AC/DC converting circuit 10 includes a full-wave bridge rectifier or a half-wave bridge rectifier.

The switching element Msw includes an input contact, an output contact, and a control contact. The input contact of the switching element Msw is connected to the AC/DC converting circuit 10. The switching element Msw is, for example, an N-type metal-oxide semiconductor field-effect transistor (N-MOSFET) or a bipolar transistor. In the first embodiment, the switching element Msw is an N-MOSFET, so the input contact of the switching element Msw is equivalent to the drain of the N-MOSFET, the output contact of the switching element Msw is equivalent to the source of the N-MOSFET, and the control contact of the switching element Msw is equivalent to the gate of the N-MOSFET.

The control unit 20 includes a power contact Vcc, a control contact GDRV, a detecting contact Vsen, and a ground contact Gnd. The control contact GDRV of the control unit 20 is connected to the control contact of the switching element Msw. The detecting contact Vsen of the control unit 20 is connected to the output contact of the switching element Msw. The first resistor R1 is disposed between the power contact Vcc of the control unit 20 and the input contact of the switching element Msw. The first resistor R1 includes a first end and a second end. The first end of the first resistor R1 is connected to the input contact of the switching element Msw and the AC/DC converting circuit 10. The second end of the first resistor R1 is connected to the power contact Vcc of the control unit 20. The control unit 20 outputs a control signal to the control contact of the switching element Msw from the control contact GDRV at a set frequency, so as to turn on or turn off the switching element Msw.

The second resistor R2 is disposed between the detecting contact Vsen and the ground contact Gnd of the control unit 20. The second resistor R2 includes a first end and a second end. The first end of the second resistor R2 is connected to the detecting contact Vsen of the control unit 20 and the output contact of the switching element Msw. The second end of the second resistor R2 is connected to the ground contact Gnd of the control unit 20. The second resistor R2 enables the control unit 20 to detect the half-cycle voltage of the DC power source. In addition, the impedance of the second resistor R2 is smaller than that of the first resistor R1, that is, the impedance of the first resistor R1 is about $10^6$ times of that of the second resistor R2.

The first capacitor C1 includes a first end and a second end. The first end of the first capacitor C1 is connected to the power contact Vcc. The second end of the first capacitor C1 is connected to the ground contact Gnd.

The first inductor L1 includes a first end and a second end. The first end of the first inductor L1 is connected to the ground contact Gnd and the second end of the first capacitor C1. The second end of the first inductor L1 is connected to a load. The load is serial LEDs including a plurality of LEDs connected in series. An anode of a first LED LED1 is connected to the second end of the first inductor L1, a cathode of the first LED LED1 is connected to an anode of the next LED, and so forth. A cathode of an $n^{th}$ LED LEDn is grounded.

The output capacitor Cout includes a first end and a second end. The first end of the output capacitor Cout is connected to the second end of the first inductor L1. The second end of the output capacitor Cout is grounded. In the first embodiment, the capacitance of the output capacitor Cout is approximately equal to that of the first capacitor C1.

The third resistor R3 includes a first end and a second end. The first end of the third resistor R3 is connected to the first end of the first inductor C1. The second end of the third resistor R3 is connected to a cathode of the first Schottky diode Dr1, and an anode of the first Schottky diode Dr1 is connected to the first end of the output capacitor Cout.

A cathode of the second Schottky diode Dr2 is connected to the ground contact Gnd of the control unit 20, and an anode of the second Schottky diode R2 is grounded.

Figure 2A:
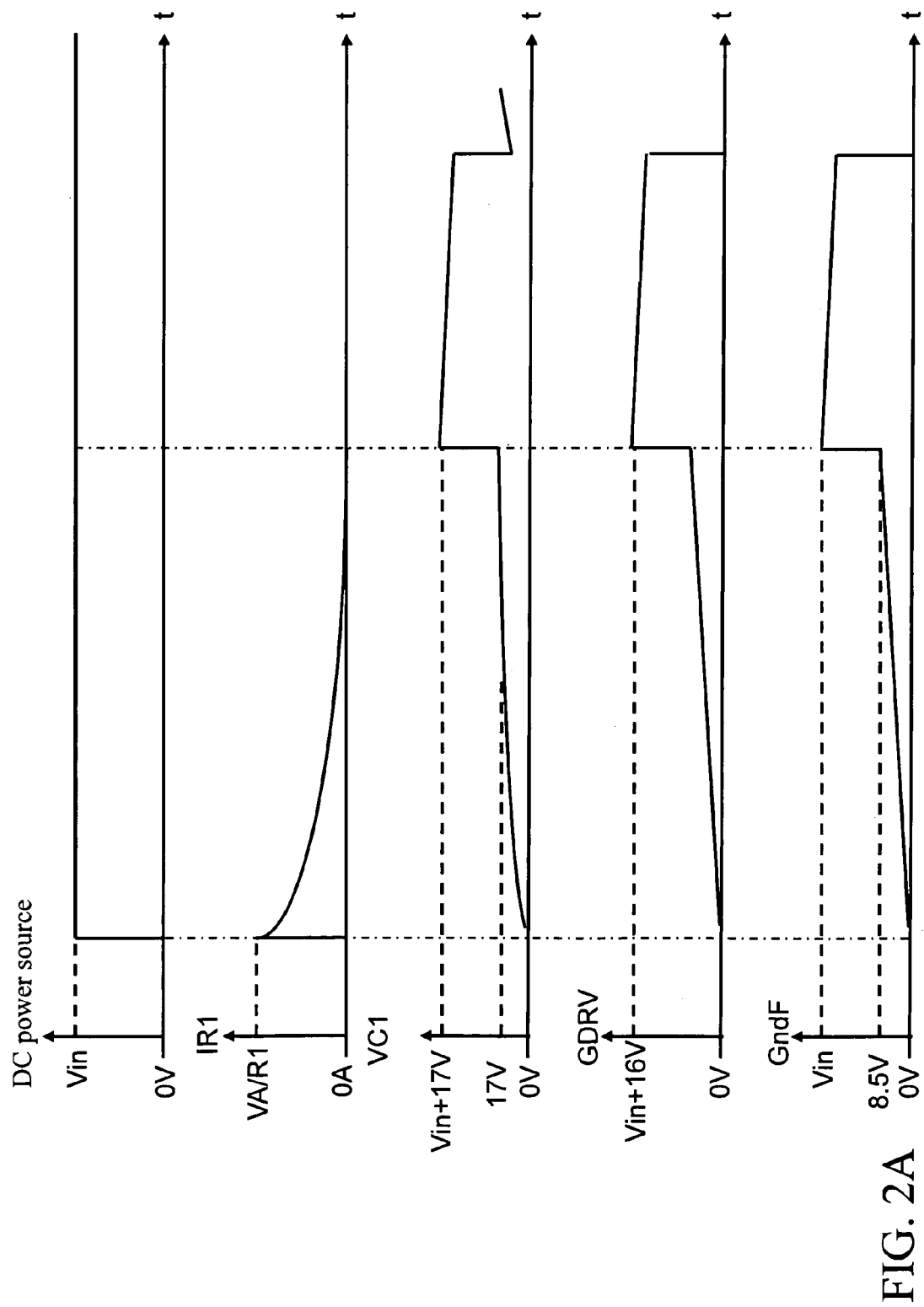
FIGS. 2A and 2B are signal timing diagrams of the first embodiment of the present invention in the starting period.
Figure 2B:
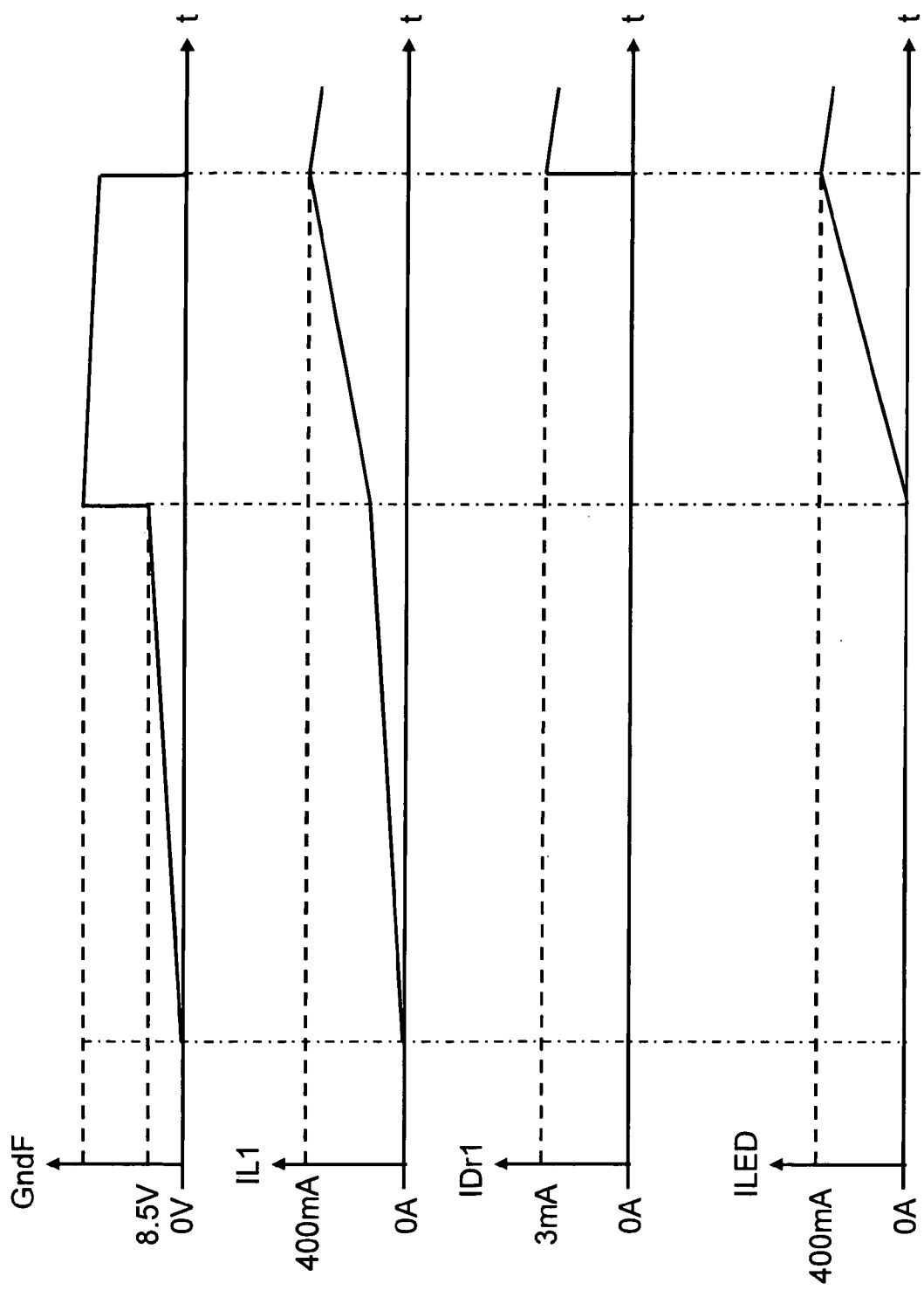

FIGS. 2A and 2B are signal timing diagrams of the first embodiment of the present invention in the starting period. In FIG. 2A, the transverse axes are the time (t), the vertical axis IR1 is a current of the first resistor, the vertical axis VC1 is a voltage of the first capacitor C1, the vertical axis GDRV is a voltage of the control contact of the control unit 20, and the vertical axis GndF is a voltage of the contact GndF. In FIG. 2B, the transverse axes are the time (t), the vertical axis GndF is the voltage of the contact GndF, the vertical axis IL1 is a current of the first inductor L1, the vertical axis IDr1 is a current of the first Schottky diode Dr1, and the vertical axis ILED is a current of the LED. Then, the operation principle of the circuit is described as follows. In the starting period of the LED driving circuit capable of performing the half-cycle detection, the switching element Msw is in turned off (OFF), and the output current IR1 of the AC/DC converting circuit 10 flows to the serial LEDs through the first resistor R1, the first capacitor C1, and the first inductor L1. The value of the output current IR1 is VA/R1, in which VA is the voltage drop between two ends of the first resistor R1. At this time, the output current IR1 charges the first capacitor C1. According to the charging status of the first capacitor C1, the output current IR1 reduces gradually. After the first capacitor C1 is charged to a saturated status, the control unit 20 starts to operate. Here, the operating voltage of the control unit 20 is 17 V. Next, the control unit 20 outputs the control signal to the switching element Msw from the control contact GDRV, so as to turn on (ON) the switching element Msw.

Figure 3:
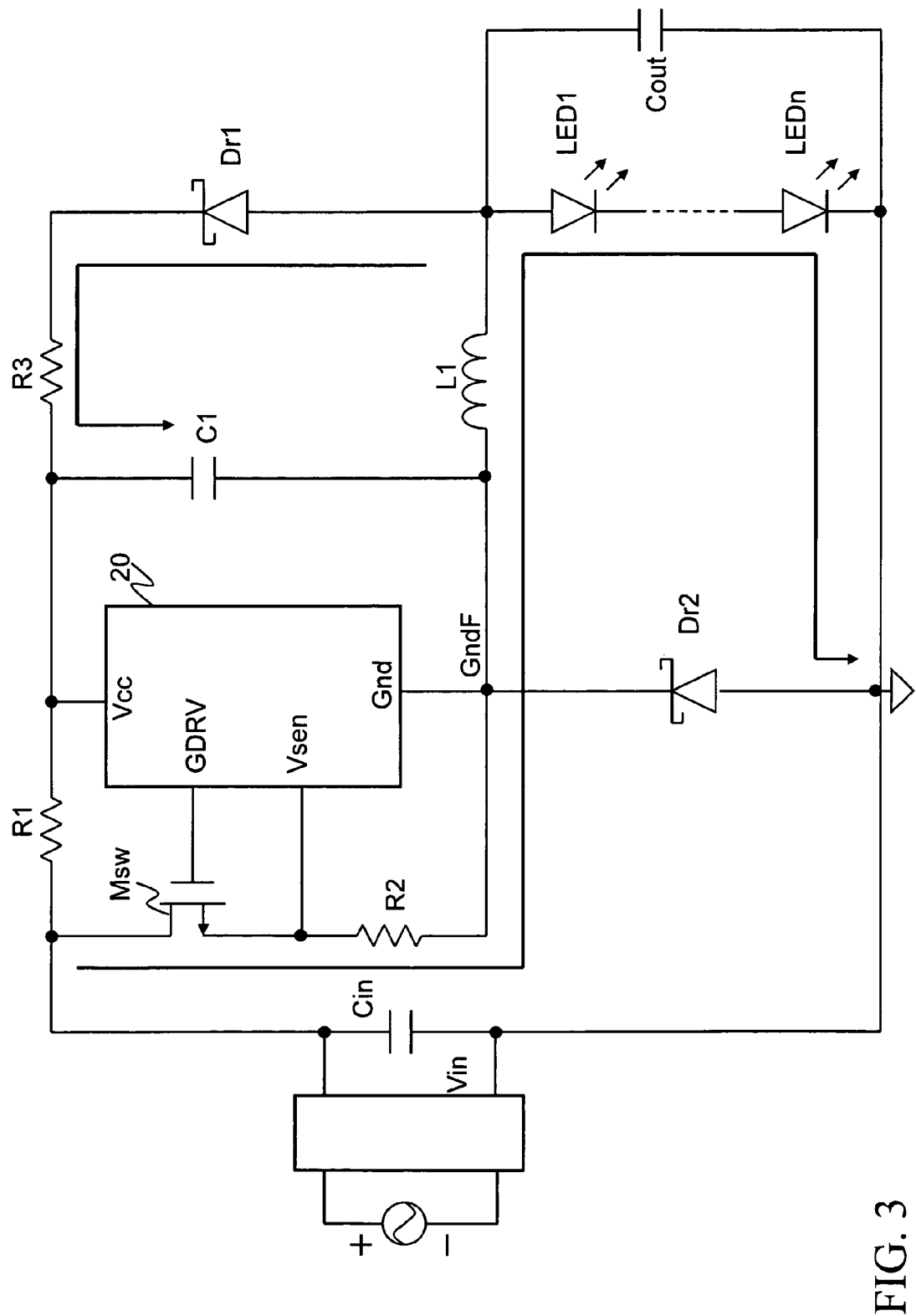
FIG. 3 is a schematic circuit diagram of the first embodiment of the present invention in a stable period.

FIG. 3 is a schematic circuit diagram of the first embodiment of the present invention in a stable period. The circuit connection of FIG. 3 is the same as that of FIG. 1, and will not be repeated here.

Figure 4A:
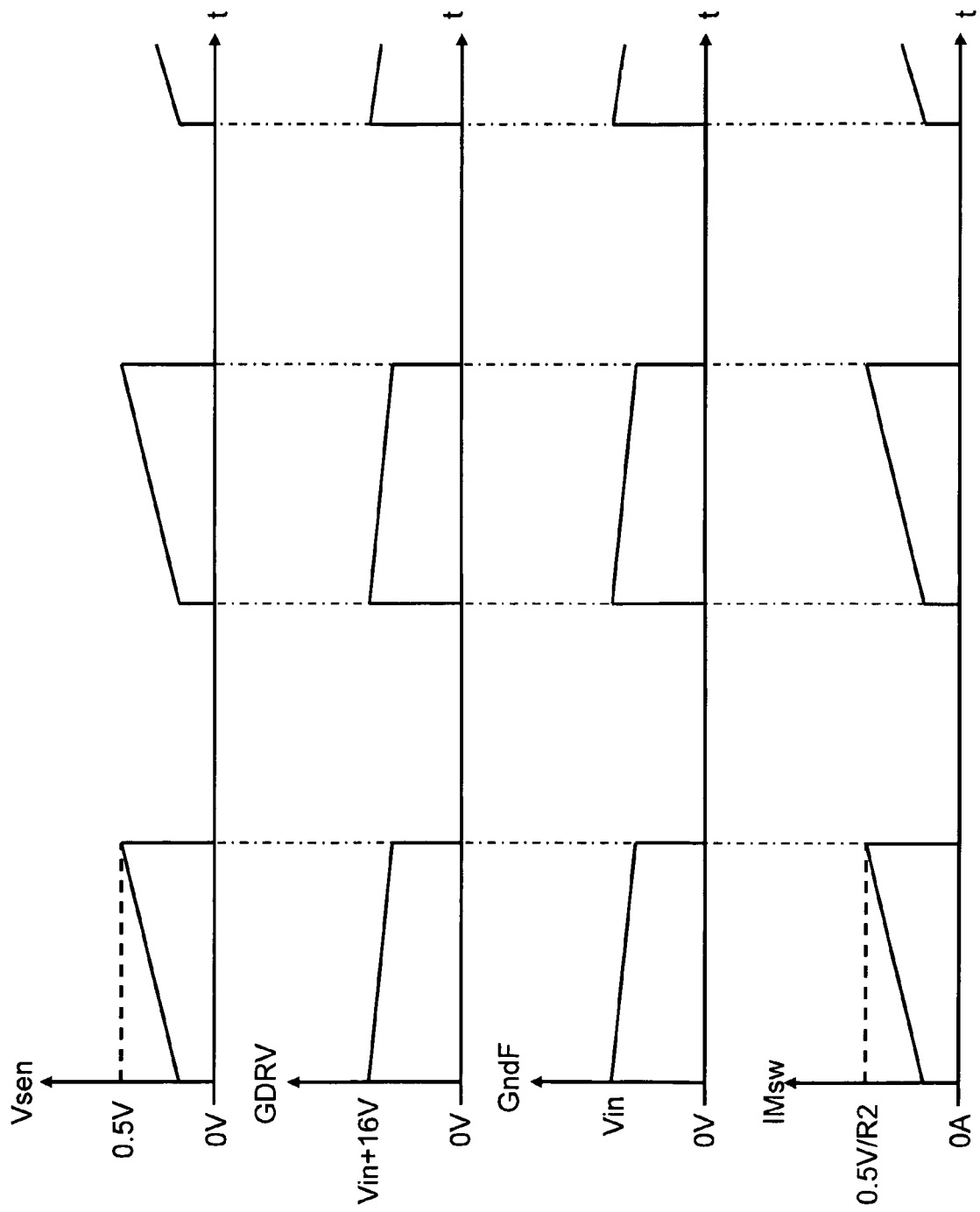
FIGS. 4A and 4B are signal timing diagrams of the first embodiment of the present invention in the stable period.
Figure 4B:
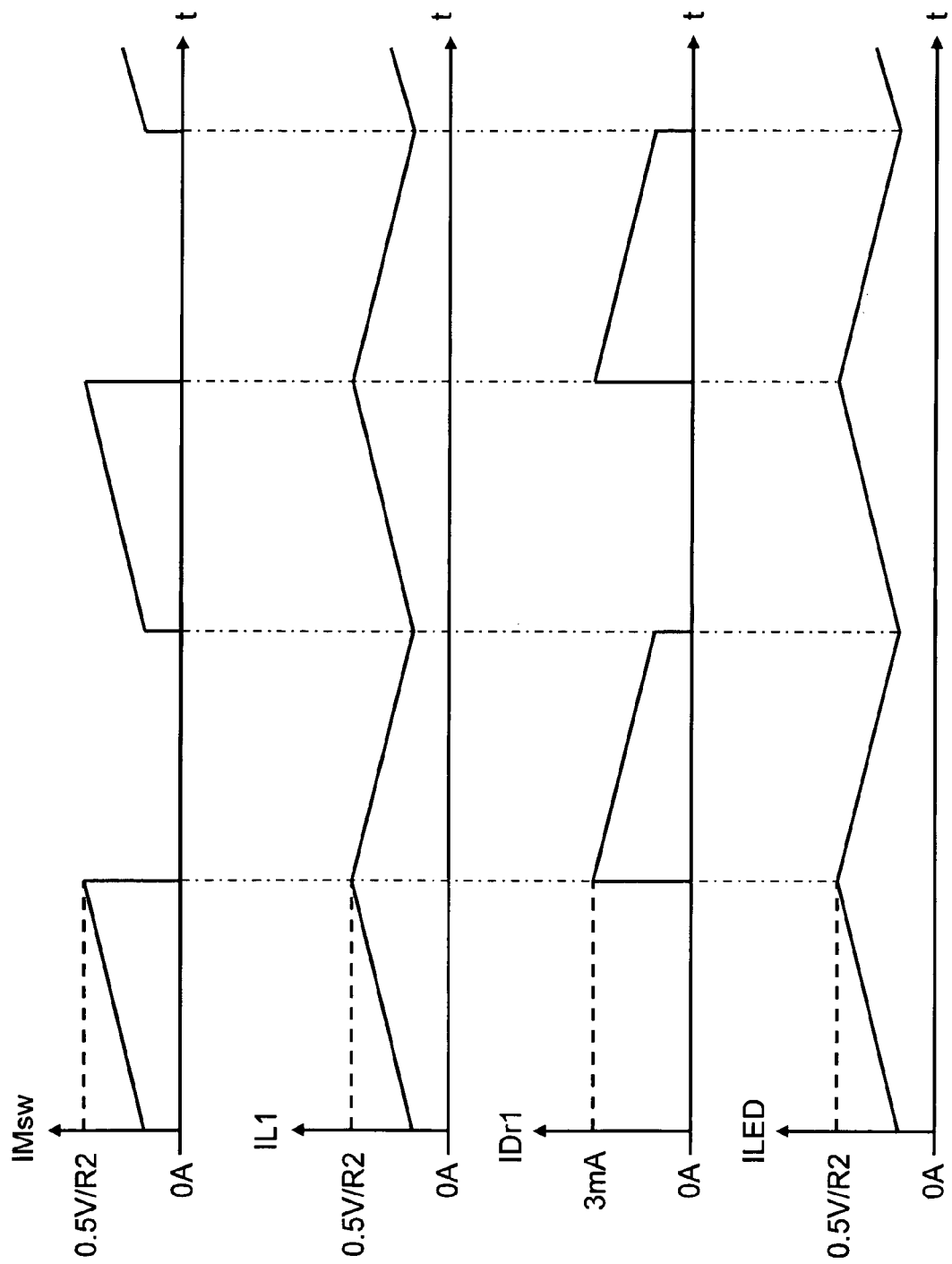

FIGS. 4A and 4B are signal timing diagrams of the first embodiment of the present invention in the stable period. In FIG. 4A, the transverse axes are the time (t), the vertical axis Vsen is a voltage of the detecting contact of the control unit 20, the vertical axis GDRV is a voltage of the control contact of the control unit 20, the vertical axis GndF is a voltage of the contact GndF, and the vertical axis IMsw is a current of the switching element. In FIG. 4B, the transverse axes are the time (t), the vertical axis IMsw is the current of the switching element, the vertical axis IL1 is a current of the first inductor L1, the vertical axis IDr1 is a current of the first Schottky diode Dr1, and the vertical axis ILED is a current of the LED. Then, the operation principle of the circuit is described as follows. In the positive half cycle of the control signal, the current IMsw charges the first inductor L1, and in the negative half cycle of the control signal, the first inductor L1 discharges, and charges the first capacitor C1 at the same time.

When the switching element Msw is turned on, the current IMsw flows to the serial LEDs through the switching element Msw, the second resistor R2, and the first inductor L1, and drives the serial LEDs to emit light. At this time, the detecting contact Vsen obtains the voltage of the second resistor R2. When the voltage of the second resistor R2 reaches a voltage (0.5 V) set by the control unit 20, the control unit 20 outputs the control signal to the switching element Msw from the control contact GDRV, so as to turn off the switching element Msw.

Next, the control unit 20 determines the time of outputting the control signal from the control contact GDRV according to a set frequency. The inductance of the first inductor L1 may influence the time of outputting the control signal from the control contact GDRV.

Figure 5:
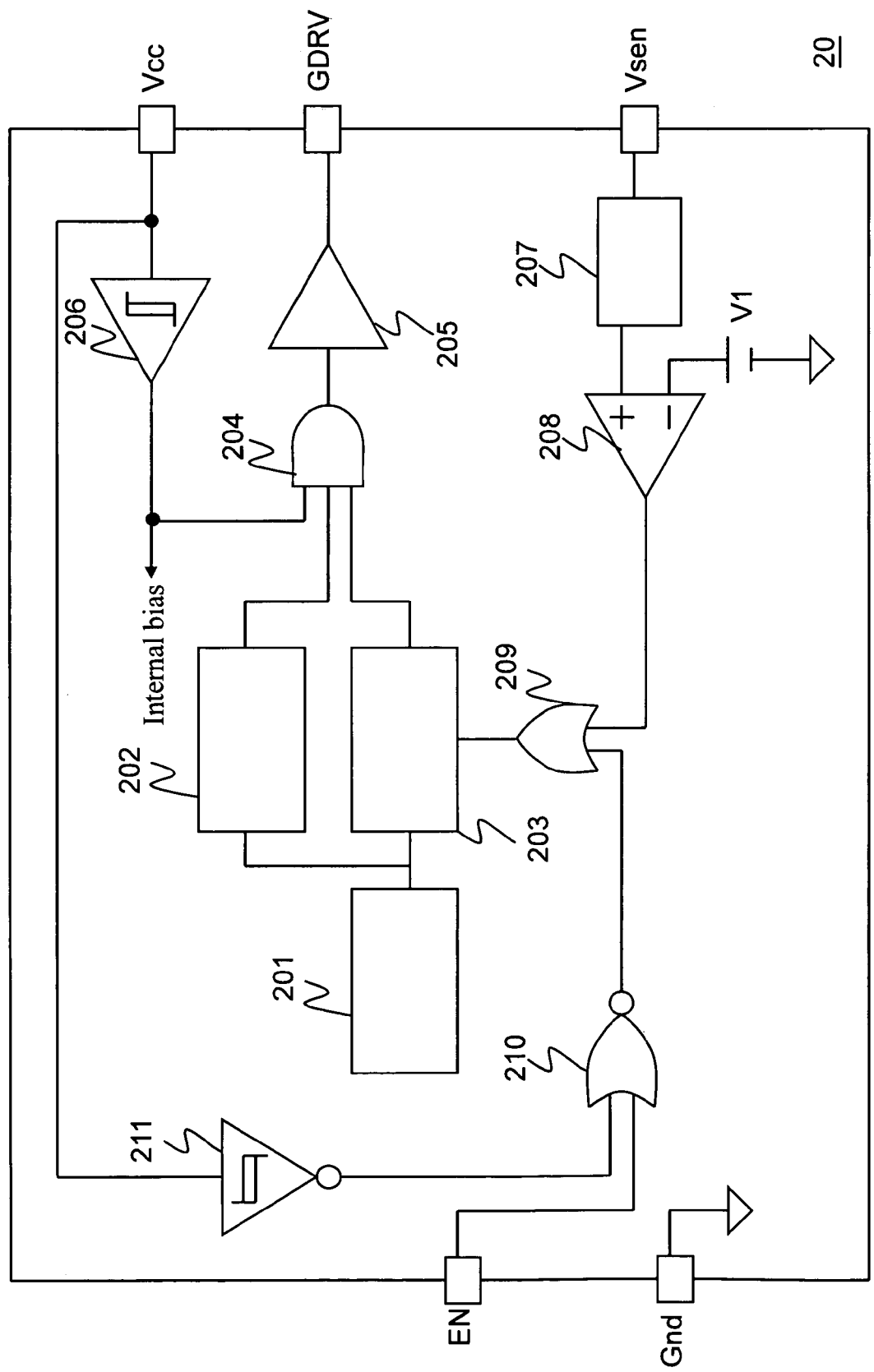
FIG. 5 is a block diagram of the circuit of the control unit according to the first embodiment of the present invention.

FIG. 5 is a block diagram of the circuit of the control unit according to the first embodiment of the present invention. As shown in FIG. 5, the control unit 20 according to the first embodiment of the present invention includes an oscillator 201, a duty cycle limit 202, a pulse width modulation (PWM) latch 203, an AND gate 204, a driver 205, a low voltage lock 206, a leading edge blanking element 207, a first comparator 208, an OR gate 209, an NOR gate 210, an over voltage protector 211, and a reference voltage V1.

An output end of the oscillator 201 is coupled to a first input end of the duty cycle limit 202 and a first input end of the PWM latch 203. An output end of the PWM latch 203 is connected to a first input end of the AND gate 204. An output end of the duty cycle limit 202 is connected to a second input end of the AND gate 204. An output end of the AND gate 204 is connected to an input end of the driver 205. An output end of the driver 205 is connected to the control contact GDRV. The power contact Vcc is connected to an input end of the low voltage lock 206 and an input end of the over voltage protector 211. An output end of the low voltage lock 206 is connected to a third input end of the AND gate 204. The detecting contact Vsen is connected to an input end of the leading edge blanking element 207. An output end of the leading edge blanking element 207 is connected to a first input end of the first comparator 208. A second input end of the first comparator 208 is connected to a first end of the reference voltage V1. A second end of the reference voltage V1 is grounded. An output end of the first comparator 208 is connected to a first input end of the OR gate 209. An output end of the OR gate 209 is connected to a second input end of the PWM latch 203.

An inverter is disposed on an output end of the over voltage protector 211, and the output end of the over voltage protector 211 is connected to a first input end of the NOR gate 210. An enabling contact EN is connected to a second input end of the NOR gate 210. An output end of the NOR gate 210 is connected to a second input end of the OR gate 209. The ground contact Gnd is grounded.

Then, the operation principle of the circuit is described as follows. When the power contact Vcc has an input power, the output end of the low voltage lock 206 outputs a high level signal to the third input end of the AND gate 204. The oscillator 201 outputs a pulse signal to the duty cycle limit 202 and the PWM latch 203.

The first comparator 208 compares the voltage obtained by the detecting contact Vsen and the voltage (0.5 V) of the reference voltage V1, and outputs a logic level signal to the OR gate 209. The OR gate 209 performs an OR operation according to the signals received by the first input end and second input end thereof, and outputs a corresponding logic level signal to the PWM latch 203.

The AND gate 204 performs an AND operation according to the signals received by the first input end, second input end, and third input end thereof, and outputs a corresponding logic level signal to the driver 205. The driver 205 outputs the control signal to the switching element Msw, so as to control the ON or OFF state of the switching element Msw.

Figure 6:
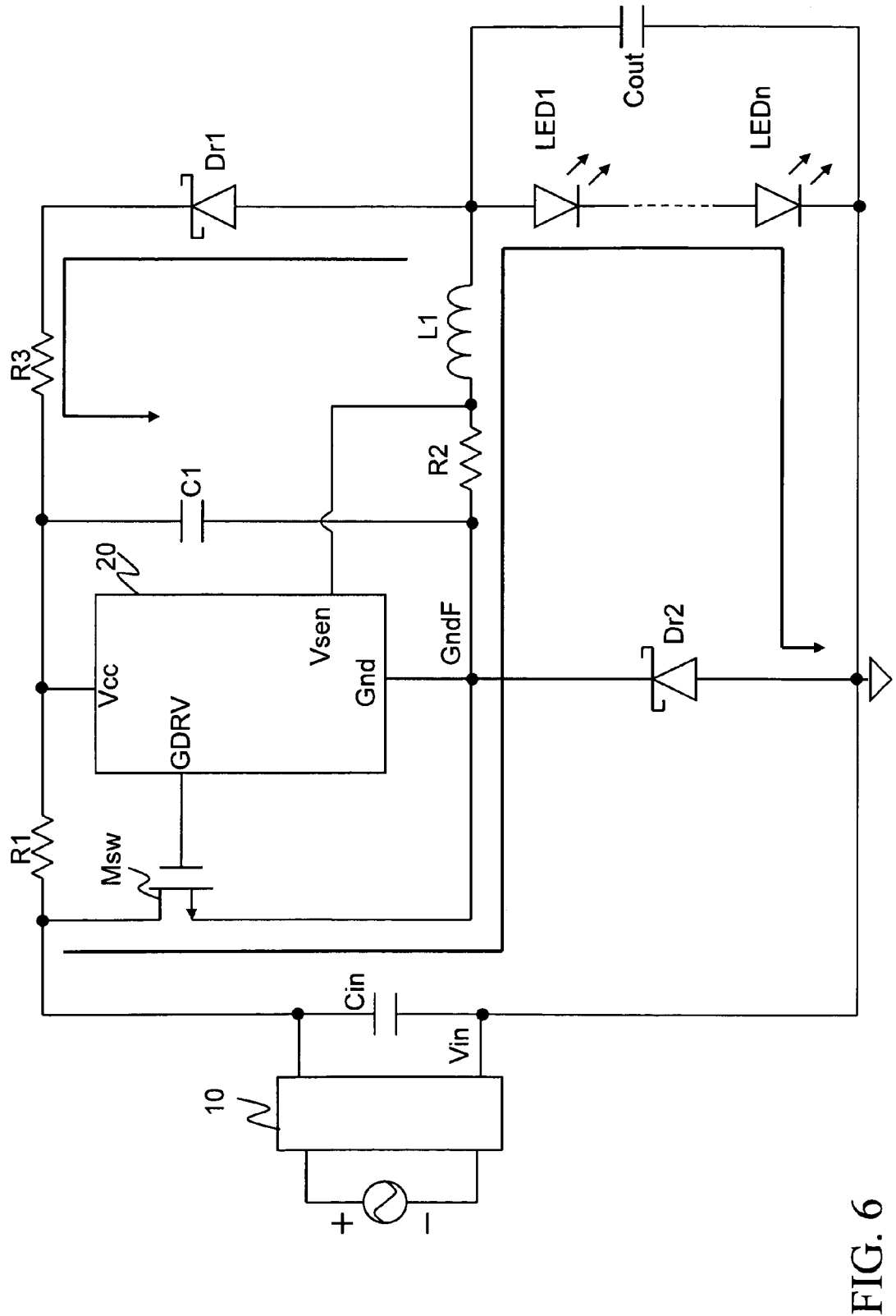
FIG. 6 is a circuit diagram of a second embodiment of the present invention.

FIG. 6 is a schematic view of a second embodiment of the present invention. Referring to FIG. 6, the LED driving circuit capable of performing full-cycle detection of the present invention includes an AC/DC converting circuit 10, a first resistor R1, a switching element Msw, a control unit 20, a second resistor R2, a first capacitor C1, a first inductor L1, a third resistor R3, a first Schottky diode Dr1, and a second Schottky diode Dr2. The "connection" mentioned below refers to electrical connection.

The AC/DC converting circuit 10 receives an AC power source, and converts the AC power source into a DC power source Vin. An output end of the AC/DC converting circuit 10 is connected to an input capacitor Cin. The AC/DC converting circuit 10 includes a full-wave bridge rectifier or a half-wave bridge rectifier.

The switching element Msw includes an input contact, an output contact, and a control contact. The input contact of the switching element Msw is connected to the AC/DC converting circuit 10. The switching element Msw is, for example, an N-MOSFET or a bipolar transistor. In the second embodiment, the switching element Msw is an N-MOSFET, so the input contact of the switching element Msw is equivalent to the drain of the N-MOSFET, the output contact of the switching element Msw is equivalent to the source of the N-MOSFET, and the control contact of the switching element Msw is equivalent to the gate of the N-MOSFET.

The control unit 20 includes a power contact Vcc, a control contact GDRV, a detecting contact Vsen, and a ground contact Gnd. The control contact GDRV of the control unit 20 is connected to the control contact of the switching element Msw. The detecting contact Vsen of the control unit 20 is connected to a first end of the second resistor R2. The ground contact Gnd of the control unit 20 is connected to the output contact of the switching element Msw. The first resistor R1 is disposed between the power contact Vcc of the control unit 20 and the input contact of the switching element Msw. The first resistor R1 includes a first end and a second end. The first end of the first resistor R1 is connected to the input contact of the switching element Msw and the AC/DC converting circuit 10. The second end of the first resistor R1 is connected to the power contact Vcc of the control unit 20. The control unit 20 outputs a control signal to the control contact of the switching element Msw from the control contact GDRV at a set frequency, so as to turn on or turn off the switching element Msw.

The second resistor R2 is disposed between the detecting contact Vsen and the ground contact Gnd of the control unit 20. The second resistor R2 includes a first end and a second end. The second end of the second resistor R2 is connected to the ground contact Gnd of the control unit 20 and a second end of the first capacitor C1. The second resistor R2 enables the control unit 20 to detect the full-cycle voltage of the DC power source. In addition, the impedance of the second resistor R2 is smaller than that of the first resistor R1, that is, the impedance of the first resistor R1 is about $10^6$ times of that of the second resistor R2.

The first capacitor C1 includes a first end and a second end. The first end of the first capacitor C1 is connected to the power contact Vcc. The second end of the first capacitor C1 is coupled to the second end of the second resistor R2.

The first inductor L1 includes a first end and a second end. The first end of the first inductor L1 is connected to the first end of the second resistor R2 and the detecting contact Vsen of the control unit 20. The second end of the first inductor L1 is connected to a load. The load is serial LEDs including a plurality of LEDs connected in series. An anode of a first LED LED1 is connected to the second end of the first inductor L1, a cathode of the first LED LED1 is connected to an anode of the next LED, and so forth. A cathode of an $n^{th}$ LED LEDn is grounded.

The output capacitor Cout includes a first end and a second end. The first end of the output capacitor Cout is connected to the second end of the first inductor L1. The second end of the output capacitor Cout is grounded. In the second embodiment, the capacitance of the output capacitor Cout is approximately equal to that of the first capacitor C1.

The third resistor R3 includes a first end and a second end. The first end of the third resistor R3 is connected to the first end of the first inductor C1. The second end of the third resistor R3 is connected to a cathode of the first Schottky diode Dr1, and an anode of the first Schottky diode Dr1 is connected to the first end of the output capacitor Cout.

A cathode of the second Schottky diode Dr2 is connected to the ground contact Gnd of the control unit 20, and an anode of the second Schottky diode R2 is grounded.

Figure 7A:
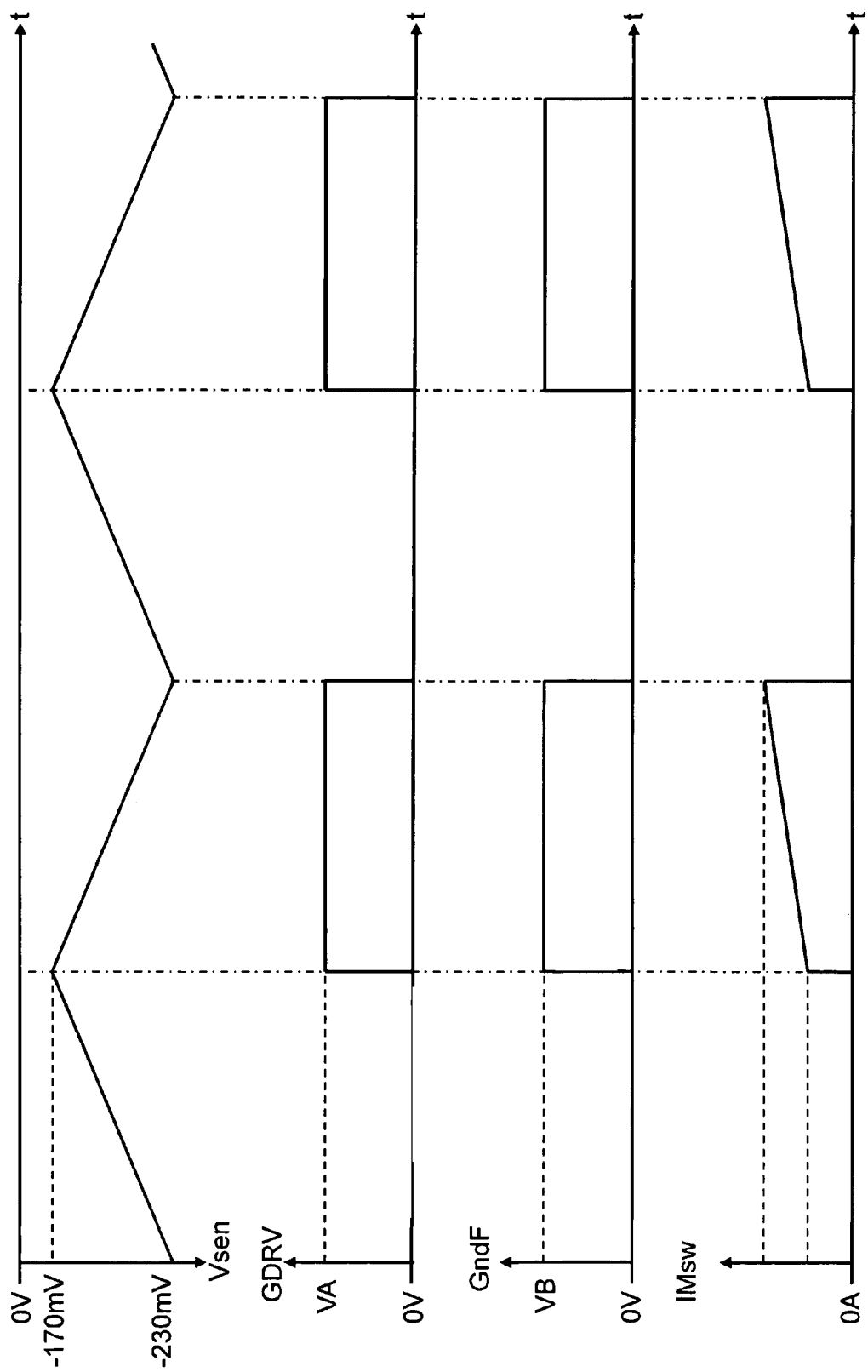
FIGS. 7A and 7B are signal timing diagrams of the second embodiment of the present invention in the stable period.
Figure 7B:
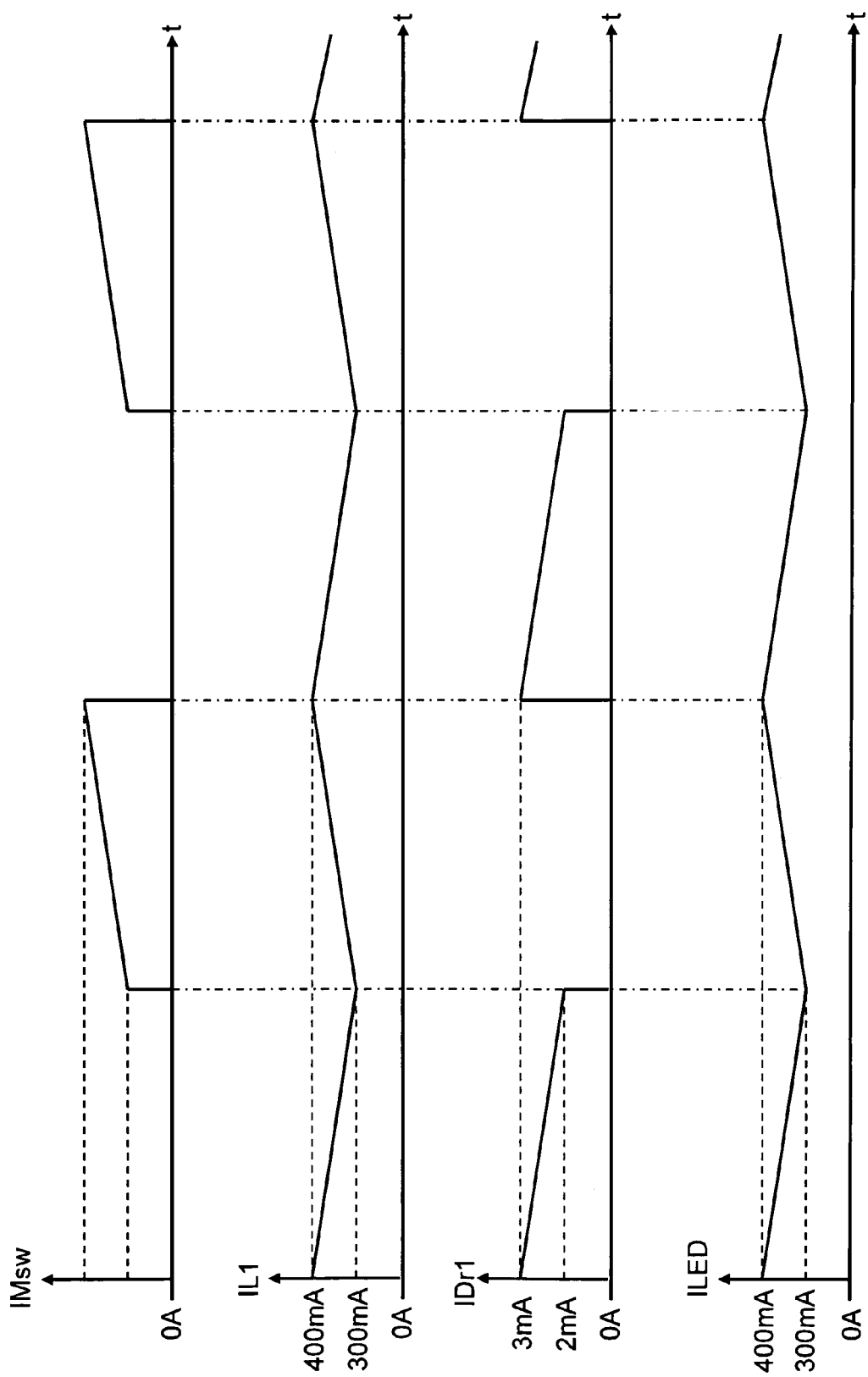

FIGS. 7A and 7B are signal timing diagrams of the second embodiment of the present invention in the stable period. In FIG. 7A, the transverse axes are the time (t), the vertical axis Vsen is a voltage of the detecting contact of the control unit 20, the vertical axis GDRV is a voltage of the control contact of the control unit 20, the vertical axis GndF is a voltage of the contact GndF, and the vertical axis IMsw is a current of the switching element. In FIG. 7B, the transverse axes are the time (t), the vertical axis IMsw is the current of the switching element, the vertical axis IL1 is a current of the first inductor L1, the vertical axis IDr1 is a current of the first Schottky diode Dr1, and the vertical axis ILED is a current of the LED. Then, the operation principle of the circuit is described as follows. In the positive half cycle of the control signal, the current IMsw charges the first inductor L1, and in the negative half cycle of the control signal, the first inductor L1 discharges, and charges the first capacitor C1 at the same time.

When the switching element Msw is turned on, the current IMsw flows to the serial LEDs through the switching element Msw, the second resistor R2, and the first inductor L1, and drives the serial LEDs to emit light. At this time, the detecting contact Vsen obtains the voltage of the second resistor R2. When the voltage of the second resistor R2 reaches a voltage (−230 mV) set by the control unit 20, the control unit 20 outputs the control signal to the switching element Msw from the control contact GDRV, so as to turn off the switching element Msw.

Next, the control unit 20 determines the time of outputting the control signal from the control contact GDRV according to the voltage (−170 mV) of the second resistor R2. The inductance of the first inductor L1 may influence the time of outputting the control signal from the control contact GDRV.

Figure 8:
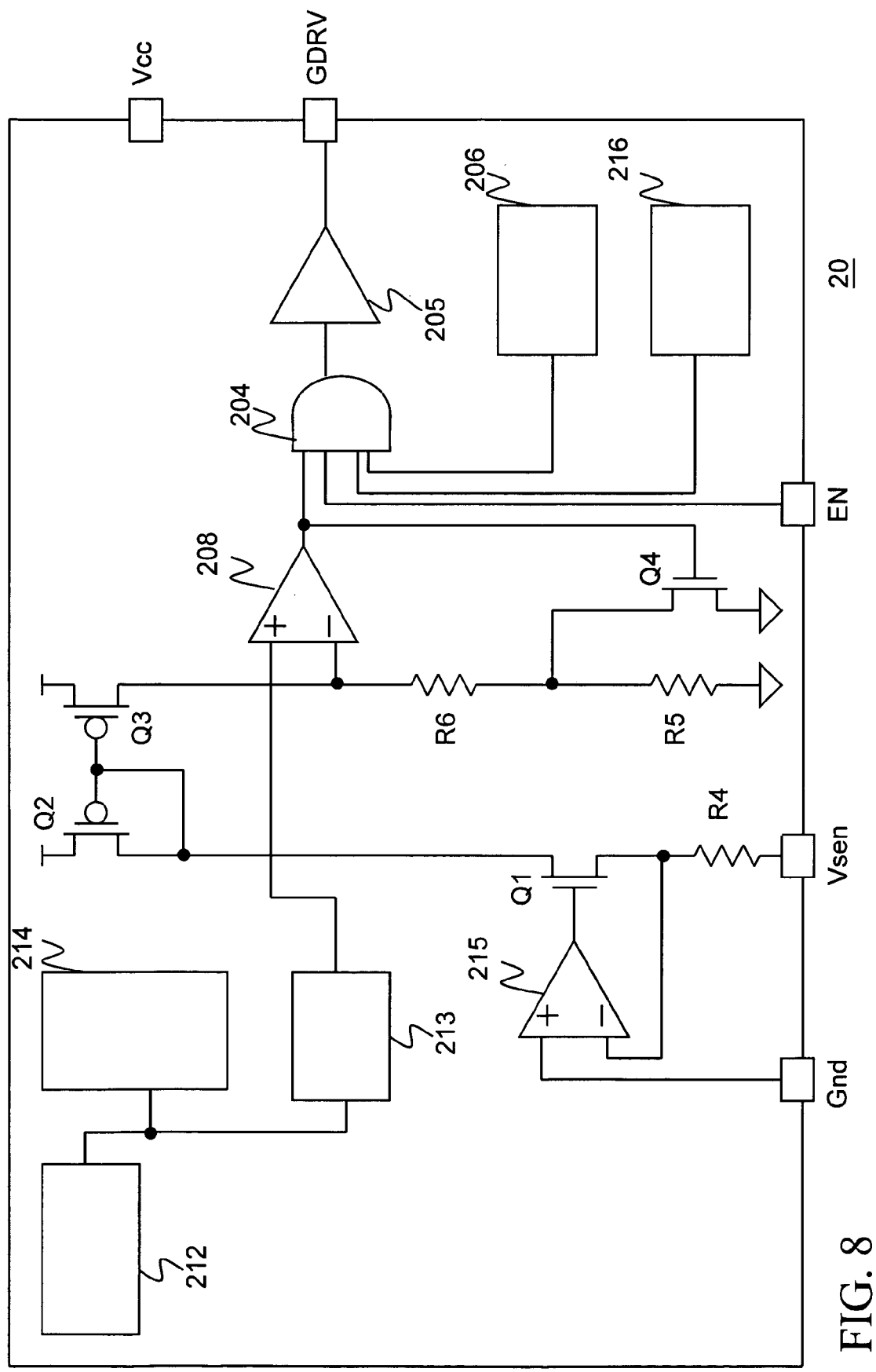
FIG. 8 is a block diagram of the circuit of the control unit according to the second embodiment of the present invention.

FIG. 8 is a block diagram of the circuit of the control unit according to the second embodiment of the present invention. As shown in FIG. 8, the control unit 20 of the second embodiment of the present invention includes an AND gate 204, a driver 205, a low voltage lock 206, a first comparator 208, a reference voltage generator 212, a voltage/current reference signal generator 213, a voltage stabilizer 214, a first operational amplifier 215, an over temperature power-off controller 216, a first semiconductor device Q1, a second semiconductor device Q2, a third semiconductor device Q3, a fourth semiconductor device Q4, a fourth resistor R4, a fifth resistor R5, and a sixth resistor R6.

An output end of the reference voltage generator 212 is connected to an input end of the voltage stabilizer 214 and an input end of the voltage/current reference signal generator 213. An output end of the voltage/current reference signal generator 213 is connected to a first input end of the first comparator 208.

A first input end of the first operational amplifier 215 is grounded. A second input end of the first operational amplifier 215 is connected to a first end of the fourth resistor R4. A second end of the fourth resistor R4 is connected to the detecting contact Vsen. An output end of the first operational amplifier 215 is connected to a control contact of the first semiconductor device Q1. An output contact of the first semiconductor device Q1 is connected to the second input end of the first operational amplifier 215. An input contact of the first semiconductor device Q1 is connected to an output contact of the second semiconductor device Q2. An input contact of the second semiconductor device Q2 is connected to the power contact Vcc. A control contact of the second semiconductor device Q2 is connected to a control contact of the third semiconductor device Q3 and the output contact of the second semiconductor device Q2.

An input contact of the third semiconductor device Q3 is connected to the power contact Vcc. An output contact of the third semiconductor device Q3 is connected to a second input end of the first comparator 208. An output end of the first comparator 208 is connected to a first input end of the AND gate 204. A first end of the fifth resistor R5 is connected to the second input end of the first comparator 208. A second end of the fifth resistor R5 is connected to a first end of the sixth resistor R6. A second end of the sixth resistor R6 is grounded.

In the second embodiment, the second semiconductor device Q2 and the third semiconductor device Q3 are P-type metal-oxide semiconductor field-effect transistors (P-MOSFETs). The input contacts of the second semiconductor device Q2 and the third semiconductor device Q3 are equivalent to sources of the P-MOSFETs. The output contacts of the second semiconductor device Q2 and the third semiconductor device Q3 are equivalent to drains of the P-MOSFETs. The control contacts of the second semiconductor device Q2 and the third semiconductor device Q3 are equivalent to gates of the P-MOSFETs.

An input contact of the fourth semiconductor device Q4 is connected to a first end of the sixth resistor R6. An output contact of the fourth semiconductor device Q4 is grounded. A control contact of the fourth semiconductor device Q4 is connected to the first input end of the AND gate 204. In the second embodiment, the fourth semiconductor device Q4 is an N-MOSFET. The input contacts of the first semiconductor device Q1 and the fourth semiconductor device Q4 are equivalent to drains of the N-MOSFETs. The output contacts of the first semiconductor device Q1 and the fourth semiconductor device Q4 are equivalent to sources of the N-MOSFETs. The control contacts of the first semiconductor device Q1 and the fourth semiconductor device Q4 are equivalent to gates of the N-MOSFETs.

A second input end of the AND gate 204 is connected to an enabling contact EN. A third input end of the AND gate 204 is connected to an output end of the over temperature power-off controller 216. A fourth input end of the AND gate 204 is connected to an output end of the low voltage lock 206. An output end of the AND gate 204 is connected to an input end of the driver 205. An output end of the driver 205 is connected to the control contact GDRV.

Figure 9:
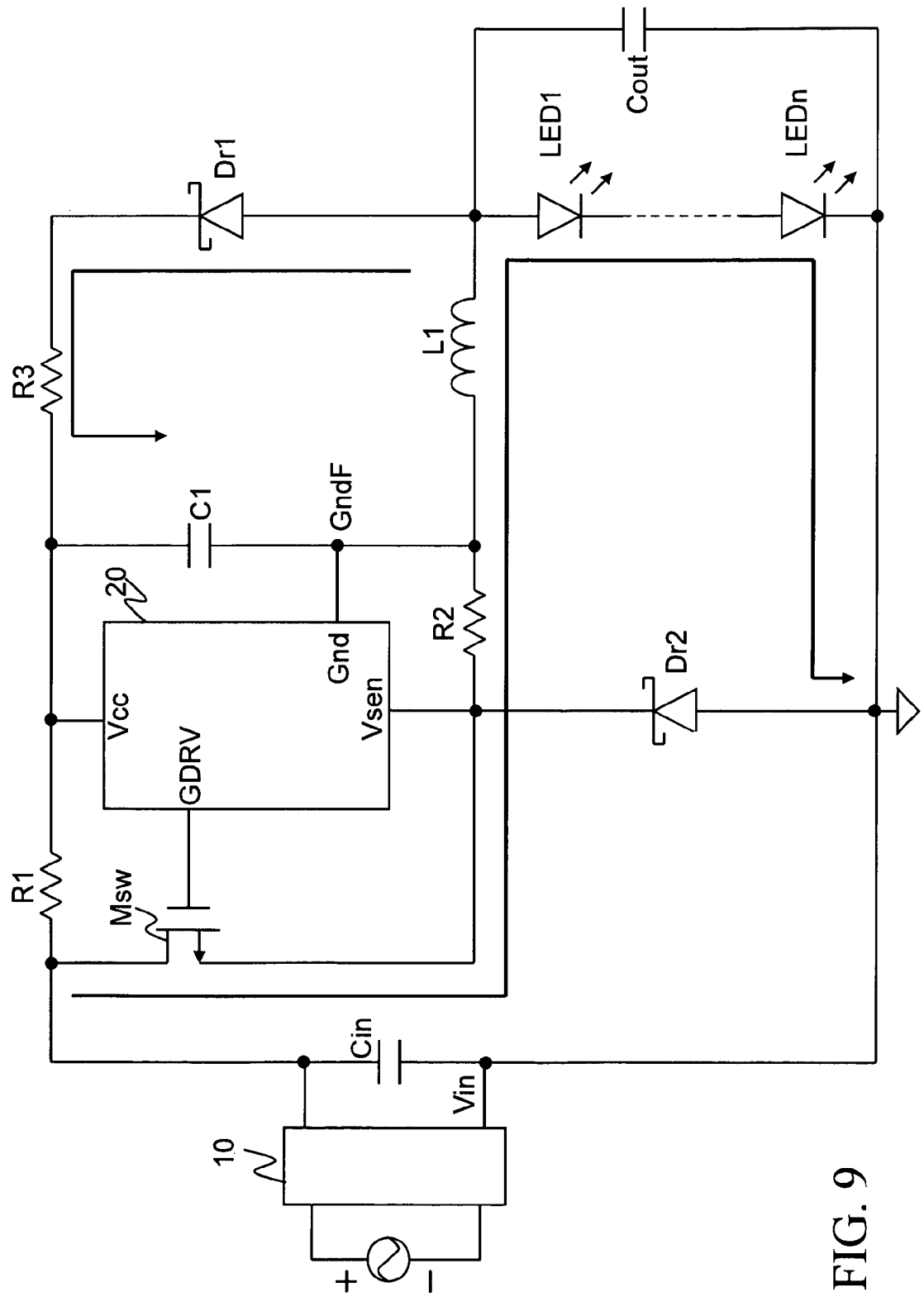
FIG. 9 is a circuit diagram of a third embodiment of the present invention.

FIG. 9 is a schematic view of a third embodiment of the present invention. As shown in FIG. 9, the difference between the third and second embodiments of the present invention lies in that in the third embodiment, the positions of the detecting contact Vsen and the ground contact Gnd are exchanged. In the second embodiment, the detecting contact Vsen obtains a negative voltage, while in the third embodiment, the detecting contact obtains a positive voltage. Other operation principles and features of the circuits of the second and the third embodiments are the same.

The circuit connection of the third embodiment is described as follows.

The AC/DC converting circuit 10 receives an AC power source, and converts the AC power source into a DC power source Vin. An output end of the AC/DC converting circuit 10 is connected to an input capacitor Cin. The AC/DC converting circuit 10 includes a full-wave bridge rectifier or a half-wave bridge rectifier.

The switching element Msw includes an input contact, an output contact, and a control contact. The input contact of the switching element Msw is connected to the AC/DC converting circuit 10. The switching element Msw is, for example, an N-MOSFET or a bipolar transistor. In the third embodiment, the switching element Msw is an N-MOSFET, so the input contact of the switching element Msw is equivalent to the drain of the N-MOSFET, the output contact of the switching element Msw is equivalent to the source of the N-MOSFET, and the control contact of the switching element Msw is equivalent to the gate of the N-MOSFET.

The control unit 20 includes a power contact Vcc, a control contact GDRV, a detecting contact Vsen, and a ground contact Gnd. The control contact GDRV of the control unit 20 is connected to the control contact of the switching element Msw. The detecting contact Vsen of the control unit 20 is connected to the second end of the second resistor R2 and the output contact of the switching element Msw.

The ground contact Gnd of the control unit 20 is connected to a first end of the second resistor R2 and a second end of the first capacitor C1. The first resistor R1 is disposed between the power contact Vcc of the control unit 20 and the input contact of the switching element Msw. The first resistor R1 includes a first end and a second end. The first end of the first resistor R1 is connected to the input contact of the switching element Msw and the AC/DC converting circuit 10. The second end of the first resistor R1 is connected to the power contact Vcc of the control unit 20. The control unit 20 outputs a control signal to the control contact of the switching element Msw from the control contact GDRV at a set frequency, so as to turn on or turn off the switching element Msw.

The second resistor R2 is disposed between the detecting contact Vsen and the ground contact Gnd of the control unit 20. The second resistor R2 includes a first end and a second end. The first end of the second resistor R2 is connected to the ground contact Gnd of the control unit 20 and a second end of the first capacitor C1. The second resistor R2 enables the control unit 20 to detect the full-cycle voltage of the DC power source. In addition, the impedance of the second resistor R2 is smaller than that of the first resistor R1, that is, the impedance of the first resistor R1 is about $10^6$ times of that of the second resistor R2.

The first capacitor C1 includes a first end and a second end. The first end of the first capacitor C1 is connected to the power contact Vcc. The second end of the first capacitor C1 is coupled to the first end of the second resistor R2 and the ground contact Gnd of the control unit 20.

The first inductor L1 includes a first end and a second end. The first end of the first inductor L1 is connected to the first end of the second resistor R2 and the second end of the first capacitor C1. The second end of the first inductor L1 is connected to a load. The load is serial LEDs including a plurality of LEDs connected in series. An anode of a first LED LED1 is connected to the second end of the first inductor L1, a cathode of the first LED LED1 is connected to an anode of the next LED, and so forth. A cathode of an $n^{th}$ LED LEDn is grounded.

The output capacitor Cout includes a first end and a second end. The first end of the output capacitor Cout is connected to the second end of the first inductor L1. The second end of the output capacitor Cout is grounded. In the first embodiment, the capacitance of the output capacitor Cout is approximately equal to that of the first capacitor C1.

The third resistor R3 includes a first end and a second end. The first end of the third resistor R3 is connected to the first end of the first inductor C1. The second end of the third resistor R3 is connected to a cathode of the first Schottky diode Dr1, and an anode of the third Schottky diode Dr1 is connected to the first end of the output capacitor Cout.

A cathode of the second Schottky diode Dr2 is connected to the detecting contact Vsen and the second end of the second resistor, and an anode of the second Schottky diode Dr2 is grounded.

Figure 10A:
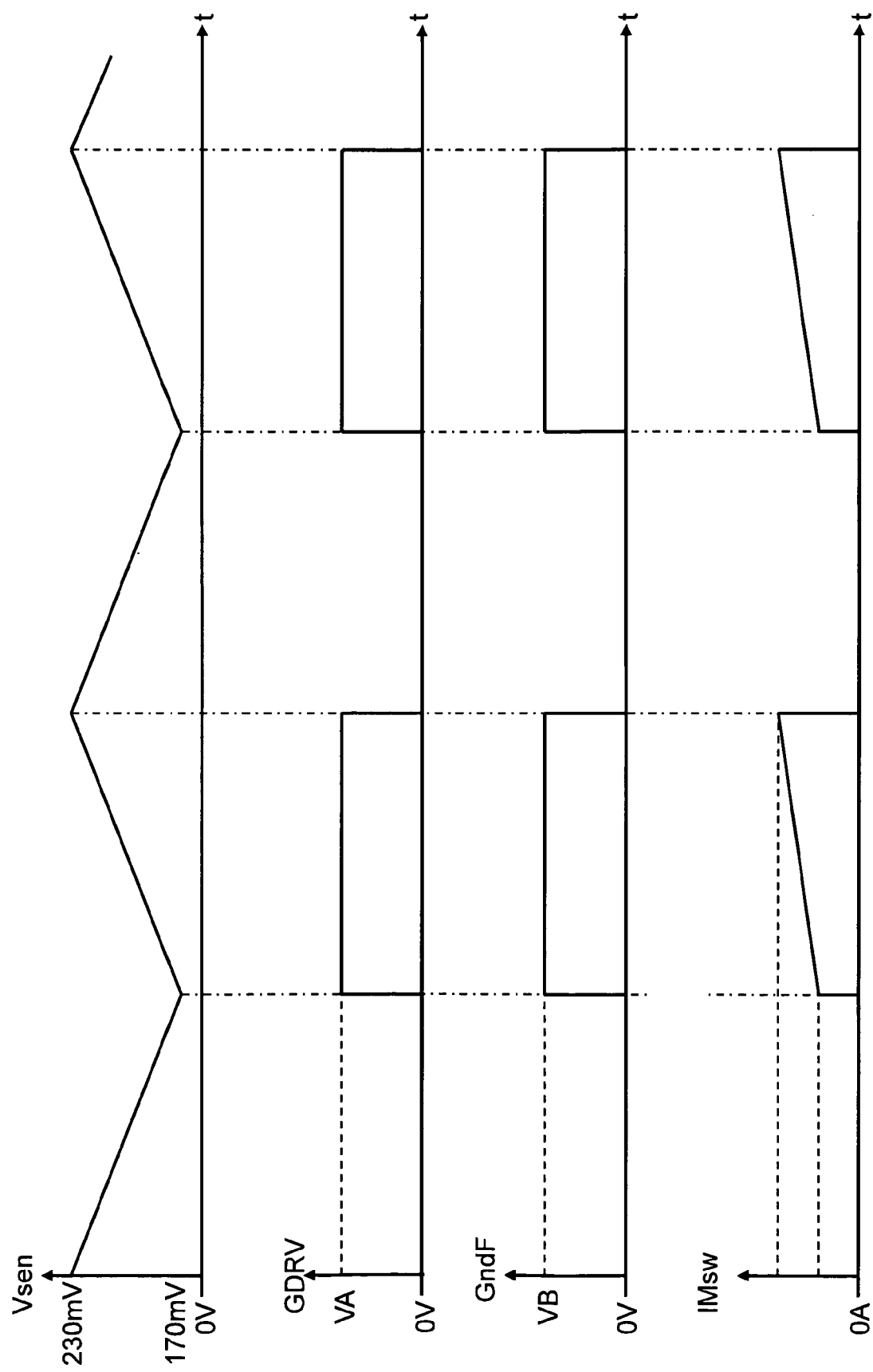
FIGS. 10A and 10B are signal timing diagrams of the third embodiment of the present invention in the stable period.
Figure 10B:
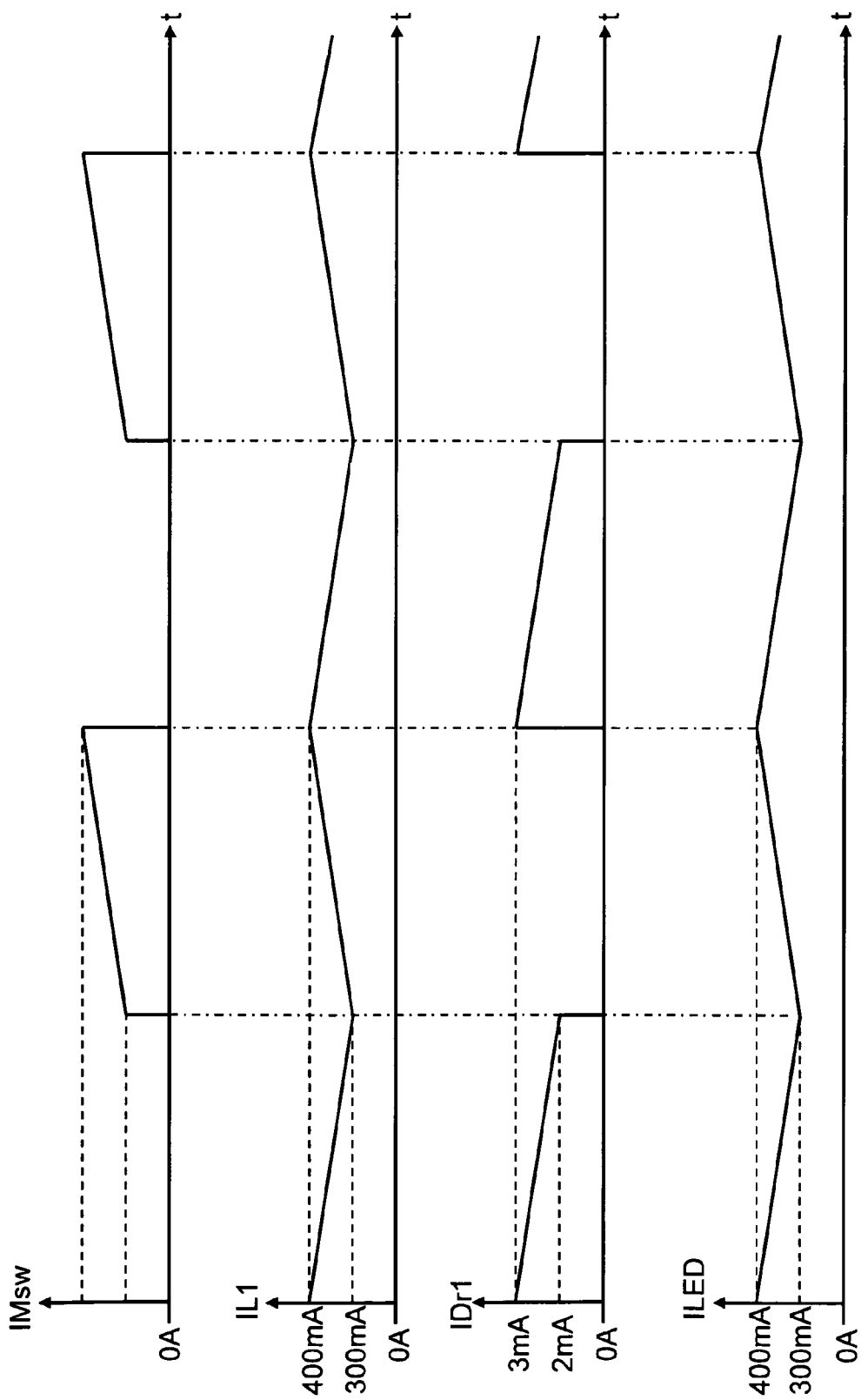

FIGS. 10A and 10B are signal timing diagrams of the third embodiment of the present invention in the stable period. In FIG. 10A, the transverse axes are the time (t), the vertical axis Vsen is a voltage of the detecting contact of the control unit 20, the vertical axis GDRV is a voltage of the control contact of the control unit 20, the vertical axis GndF is a voltage of the contact GndF, and the vertical axis IMsw is a current of the switching element. In FIG. 10B, the transverse axes are the time (t), the vertical axis IMsw is the current of the switching element, the vertical axis IL1 is a current of the first inductor L1, the vertical axis IDr1 is a current of the first Schottky diode Dr1, and the vertical axis ILED is a current of the LED. Then, the operation principle of the circuit is described as follows. In the positive half cycle of the control signal, the current IMsw charges the first inductor L1, and in the negative half cycle of the control signal, the first inductor L1 discharges, and charges the first capacitor C1 at the same time.

When the switching element Msw is turned on, the current IMsw flows to the serial LEDs through the switching element Msw, the second resistor R2, and the first inductor L1, and drives the serial LEDs to emit light. At this time, the detecting contact Vsen obtains the voltage of the second resistor R2. When the voltage of the second resistor R2 reaches a voltage (+230 mV) set by the control unit 20, the control unit 20 outputs the control signal to the switching element Msw from the control contact GDRV, so as to turn off the switching element Msw.

Next, the control unit 20 determines the time of outputting the control signal from the control contact GDRV according to the voltage (+170 mV) of the second resistor R2. The inductance of the first inductor L1 may influence the time of outputting the control signal from the control contact GDRV.

To sum up, the LED driving circuit capable of performing the half-cycle or full-cycle detection of the present invention uses a detecting loop composed by the second resistor and the control unit to obtain the half-cycle or full-cycle driving voltage of the DC power source, and compares the obtained driving voltage and a set target voltage. According to a comparison result, the control unit turns on or turns off a current switching circuit inputting a driving current to the LED, so as to precisely control the driving current of the LED.

What is claimed is:

1. A light-emitting diode (LED) driving circuit, for driving an LED, comprising:
    an AC/DC converting circuit, for converting an AC power source into a DC power source;
    a switching element, having an input contact, an output contact, and a control contact, wherein the input contact is connected to the AC/DC converting circuit;
    a control unit, having a power contact, a control contact, a detecting contact, and a ground contact, wherein a first resistor is disposed between the power contact of the control unit and the input contact of the switching element, and the control unit outputs a control signal to the control contact of the switching element from the control contact according to a set frequency, so as to turn on or turn off the switching element;
    a second resistor, disposed between the detecting contact and the ground contact of the control unit, for enabling the control unit to detect a voltage of the DC power source;
    a first capacitor, having a first end and a second end, wherein the first end of the first capacitor is connected to the power contact, and the second end of the first capacitor is connected to the ground contact;
    a first inductor, having a first end and a second end, wherein the first end of the first inductor is connected to the ground contact and the second end of the first capacitor, and the second end of the first inductor is connected to the LED;
    a third resistor, having a first end and a second end, wherein the first end of the third resistor is connected to the first end of the first capacitor; and
    a first Schottky diode, having a cathode and an anode, wherein the cathode of the first Schottky diode is connected to the second end of the third resistor, and the anode of the first Schottky diode is connected to the second end of the first inductor.

2. The LED driving circuit according to claim 1, wherein the AC/DC converting circuit comprises a full-wave bridge rectifier.

3. The LED driving circuit according to claim 1, wherein the AC/DC converting circuit comprises a half-wave bridge rectifier.

4. The LED driving circuit according to claim 1, wherein the second end of the first inductor is connected to an anode of the LED, and a cathode of the LED is grounded.

5. The LED driving circuit according to claim 1, wherein the ground contact is connected to a cathode of a second Schottky diode, and an anode of the second Schottky diode is grounded.

6. The LED driving circuit according to claim 1, further comprising an output capacitor having a first end and a second end, wherein the first end of the output capacitor is connected to the anode of the first Schottky diode, and the second end of the output capacitor is grounded.

7. A light-emitting diode (LED) driving circuit, for driving an LED, comprising:
    an AC/DC converting circuit, for converting an AC power source into a DC power source;
    a switching element, having an input contact, an output contact, and a control contact, wherein the input contact is connected to the AC/DC converting circuit;
    a control unit, having a power contact, a control contact, a detecting contact, and a ground contact, wherein a first resistor is disposed between the power contact of the control unit and the input contact of the switching element, and the control unit outputs a control signal to the control contact of the switching element from the control contact, so as to turn on or turn off the switching element;
    a second resistor, having a first end and a second end, and disposed between the detecting contact and the ground contact of the control unit, for enabling the control unit to detect a voltage of the DC power source, so as to determine whether to output the control signal;
    a first capacitor, having a first end and a second end, wherein the first end of the first capacitor is connected to the power contact, and the second end of the first capacitor is connected to the ground contact and the second end of the second resistor;
    a first inductor, having a first end and a second end, wherein the first end of the first inductor is connected to the first end of the second resistor, and the second end of the first inductor is connected to the LED;
    a third resistor, having a first end and a second end, wherein the first end of the third resistor is connected to the first end of the first capacitor; and
    a first Schottky diode, having a cathode and an anode, wherein the cathode of the first Schottky diode is connected to the second end of the third resistor, and the anode of the first Schottky diode is connected to the second end of the first inductor.

8. The LED driving circuit according to claim 7, wherein the AC/DC converting circuit comprises a full-wave bridge rectifier.

9. The LED driving circuit according to claim 7, wherein the AC/DC converting circuit comprises a half-wave bridge rectifier.

10. The LED driving circuit according to claim 7, wherein the second end of the first inductor is connected to an anode of the LED, and a cathode of the LED is grounded.

11. The LED driving circuit according to claim 7, wherein the third resistor and the first Schottky diode is connected in series between the first end of the first capacitor and the second end of the first inductor.

12. The LED driving circuit according to claim 7, wherein the ground contact is connected to a cathode of a second Schottky diode, and an anode of the second Schottky diode is grounded.

13. The LED driving circuit according to claim 7, further comprising an output capacitor having a first end and a second end, wherein the first end of the output capacitor is connected to the anode of the first Schottky diode, and the second end of the output capacitor is grounded.

14. A light-emitting diode (LED) driving circuit, for driving an LED, comprising:
- an AC/DC converting circuit, for converting an AC power source into a DC power source;
- a switching element, having an input contact, an output contact, and a control contact, wherein the input contact is connected to the AC/DC converting circuit;
- a control unit, having a power contact, a control contact, a detecting contact, and a ground contact, wherein a first resistor is disposed between the power contact of the control unit and the input contact of the switching element, and the control unit outputs a control signal to the control contact of the switching element from the control contact, so as to turn on or turn off the switching element;
- a second resistor, having a first end and a second end, and disposed between the detecting contact and the ground contact of the control unit, for enabling the control unit to detect a voltage of the DC power source, so as to determine whether to output the control signal;
- a first capacitor, having a first end and a second end, wherein the first end of the first capacitor is connected to the power contact, and the second end of the first capacitor is connected to the ground contact and the first end of the second resistor;
- a first inductor, having a first end and a second end, wherein the first end of the first inductor is connected to the first end of the second resistor, and the second end of the first inductor is connected to the LED;
- a third resistor, having a first end and a second end, wherein the first end of the third resistor is connected to the first end of the first capacitor; and
- a first Schottky diode, having a cathode and an anode, wherein the cathode of the first Schottky diode is connected to the second end of the third resistor, and the anode of the first Schottky diode is connected to the second end of the first inductor.

15. The LED driving circuit according to claim 14, wherein the AC/DC converting circuit comprises a full-wave bridge rectifier.

16. The LED driving circuit according to claim 14, wherein the AC/DC converting circuit comprises a half-wave bridge rectifier.

17. The LED driving circuit according to claim 14, wherein the second end of the first inductor is connected to an anode of the LED, and a cathode of the LED is grounded.

18. The LED driving circuit according to claim 14, wherein a third resistor and a first Schottky diode is connected in series between the first end of the first capacitor and the second end of the first inductor.

19. The LED driving circuit according to claim 14, wherein the detecting contact is connected to a cathode of a second Schottky diode and the second end of the second resistor, and an anode of the second Schottky diode is grounded.

20. The LED driving circuit according to claim 14, further comprising an output capacitor having a first end and a second end, wherein the first end of the output capacitor is connected to the anode of the first Schottky diode, and the second end of the output capacitor is grounded.

* * * * *